(12) United States Patent
Millet (10) Patent No.: US 11,588,611 B2
(45) Date of Patent: Feb. 21, 2023

(54) DETERMINISTIC HARDWARE SYSTEM FOR COMMUNICATION BETWEEN AT LEAST ONE SENDER AND AT LEAST ONE RECEIVER, WHICH IS CONFIGURED TO STATICALLY AND PERIODICALLY SCHEDULE THE DATA FRAMES, AND A METHOD FOR MANAGING THE RECEPTION OF DATA FRAMES

(71) Applicant: COMMISSARIAT A L'ENERGIE ATOMIQUE ET AUX ENERGIES ALTERNATIVES, Paris (FR)

(72) Inventor: Raphaël Millet, Gif-sur-Yvette (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 29 days.

(21) Appl. No.: 17/202,216

(22) Filed: Mar. 15, 2021

(65) Prior Publication Data
US 2021/0320781 A1 Oct. 14, 2021

(30) Foreign Application Priority Data
Apr. 9, 2020 (FR) ........................... 2003553

(51) Int. Cl.
*H04L 7/00* (2006.01)
*H04L 69/22* (2022.01)

(52) U.S. Cl.
CPC .......... *H04L 7/0016* (2013.01); *H04L 7/0079* (2013.01); *H04L 7/0091* (2013.01); *H04L 69/22* (2013.01)

(58) Field of Classification Search
CPC ... H04L 7/0016; H04L 7/0079; H04L 7/0091; H04L 69/22
See application file for complete search history.

(56) References Cited

U.S. PATENT DOCUMENTS

| | | | |
|---|---|---|---|
| 9,112,780 B2 | 8/2015 | Wong et al. | |
| 2013/0343199 A1* | 12/2013 | Wong | H04L 41/0631 370/242 |

OTHER PUBLICATIONS

Zhou, et al., "On design and formal verification of SNSP: a novel real-time communication protocol for safety-critical applications", The Journal of Supercomputing, vol. 69, pp. 1254-1283, 2014.
Nasrallah, et al., "Ultra-Low Latency (ULL) Networks: The IEEE TSN and IETF DetNet Standards and Related 5G ULL Research", IEEE Communications Surveys & Tutorials, vol. 21, Issue: 1, 2019.

* cited by examiner

Primary Examiner — Duc C Ho
(74) Attorney, Agent, or Firm — BakerHostetler (57) ABSTRACT

Method and system for managing the reception of data frames, scheduled statically and periodically, a frame includes a header provided with an identifier (id) of the frame and an index (index) representing the occurrence of the frame in a hyper-period.

5 Claims, 8 Drawing Sheets

Fig. 1

PRIOR ART

Fig. 2

PRIOR ART

DETERMINISTIC HARDWARE SYSTEM FOR COMMUNICATION BETWEEN AT LEAST ONE SENDER AND AT LEAST ONE RECEIVER, WHICH IS CONFIGURED TO STATICALLY AND PERIODICALLY SCHEDULE THE DATA FRAMES, AND A METHOD FOR MANAGING THE RECEPTION OF DATA FRAMES

This application claims priority to foreign French patent application No. FR 2003553, filed on Apr. 9, 2020, the disclosure of which is incorporated by reference in its entirety.

FIELD OF THE INVENTION

The invention relates to a deterministic hardware system for communication between at least one sender and at least one receiver, which is configured to statically and periodically schedule the data frames, and a method for managing the reception of data frames.

The field of the invention is that of communications between a sender and a receiver, for example in the computing environment of distributed CPSs (cyber-physical systems). A CPS is a system in which electronic devices collaborate in order to control physical entities (sensors, actuators, etc.). There is therefore a need for a deterministic real-time environment capable of coping with the heterogeneity of the communication means and calculations. It is also necessary to be able to verify the validity of the scheduling of the communications and of their time constraints.

BACKGROUND

Standards exist such as 802.1Qbv "Scheduled Traffic", 802.1Qci "Filtering and Policing", or 802.1AS "Time Synchronization".

The standard 802.1Qbv "Scheduled Traffic" defines various classes of communication: Priority1, Priority2 . . . , and Best Effort. Time slots are therefore reserved in order to ensure network availability for each class. A communication gateway incorporating this standard blocks or allows communications via a gate mechanism (open/closed) depending on the class detected.

The standard 802.1Qci "Filtering and Policing" allows frames to be filtered according to a certain number of configurable criteria such as the maximum size of a frame. It also records statistics regarding the frames such as the number of frames rejected.

The standard 802.1AS "Time Synchronization" provides solutions for handling the problem of the overall synchronization of the system.

None of these standards makes it possible to detect the absence of reception of a frame in a predetermined schedule.

Figure 1:
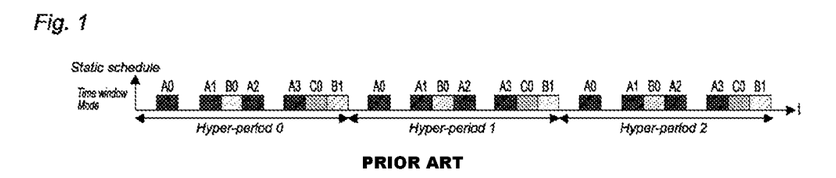
FIG. 1 schematically illustrates hyper-periods in a static and periodic schedule for communications, according to the prior art.

FIG. 1 schematically illustrates hyper-periods in a static and periodic schedule for communications.

FIG. 1 shows time windows, or "time window mode", for a static and periodic schedule.

FIG. 1 shows periodic time windows. Known offline analysis methods take into account the communications and their time constraints in order to define a hyper-period in the schedule. This hyper-period is composed of a series of time windows, Hyper-period_0, Hyper-period_1, and Hyper-period_2, in which the communications are expected.

In FIG. 1, the data A (windows in a first shade of grey) correspond to the same type of data at different times. For example, a sensor gives different values at different times. In the sending period for a type of data, there is a greater or smaller number of communications per hyper-period.

Figure 2:
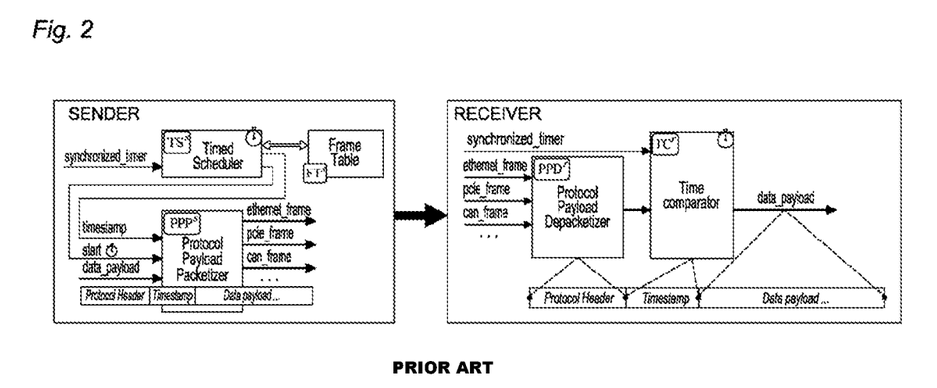
FIG. 2 schematically illustrates a system comprising a sender and a receiver implementing a static and periodic schedule for communications, according to the prior art.

FIG. 2 schematically shows a communication system between a sender and a receiver according to the prior art.

The sender SENDER incorporates a time scheduler TSs responsible for triggering the communications at the times planned in the schedule. The date or time of sending, or timestamp, is transported in the frame. A protocol payload packetizer PPPt, triggered by a start flag, encapsulates the timestamp of the frame and the payload data data_payload according to the communication protocol used. The receiver RECEIVER provides a time check according to a defined interval; it comprises a protocol payload depacketizer PPDr configured to decode the timestamp of the frame according to the communication protocol used and to transmit the depacketized frame to a time comparator TCr.

This type of solution does not allow all schedule drifts to be detected. If a frame does not arrive at its destination or is not sent, the receiver does not detect any error.

SUMMARY OF THE INVENTION

One aim of the invention is to overcome the abovementioned problems.

Thus, what is proposed, according to one aspect of the invention, is a method for managing the reception of data frames in deterministic real time by implementing dedicated hardware, scheduled statically and periodically, a frame comprising a header provided with an identifier of the frame and an index representing the occurrence of said frame in a hyper-period, comprising the steps of:

storing, for a frame identifier, an activation flag for the identifier of the frame representative of the activity of the frame in the configuration currently running, a local index representative of the expected index for the frame, an open flag representative of the opening of a time window associated with the identifier of the frame, an opening time and a closing time for the time window, an acknowledgement flag representative of the valid reception of the expected frame, an error counter for expected frame reception representative of the successive number of frames not received in the expected respective time window, a fatal error flag representative of the error counter reaching a configurable maximum error value, a number of possible values of the index that may be taken by the index in a hyper-period;

performing in parallel:
  iteratively:
    waiting for the reception of a frame, and on reception of a frame, testing whether the status of the activation flag for the identifier is raised, and whether the fatal error flag is lowered, and whether the open flag is raised, and whether the value of a valid index equal to the remainder of the Euclidean division of the sum of a local index with the value of the expected index and with the value of the error counter by the number of possible values of the index is equal to the value of the index of the frame,
    if so, resetting the error counter to 0 and raising the acknowledgement flag, and if the value of the valid index is lower than the number of possible values index_overflow of the index, updating the value of the local index with the value of the valid index increased by 1, otherwise resetting the valid index to 0, and otherwise, rejecting the frame; and
iteratively:
  when the opening time for a frame is reached, raising the open flag and when the closing time is reached, lowering the open flag;
  if the fatal error flag is raised, moving on to the next window, otherwise, if the acknowledgement flag is raised, then lowering the acknowledgement flag, otherwise incrementing the error counter by 1, and if the error counter has a different value than the maximum error value, then lowering the fatal error flag;
  moving on to the next time window.

A flag is said to be raised when its value is equal to 1, or true or valid and is said to be lowered when its value is equal to 0, or false or invalid.

Such a method makes it possible to detect the absence of reception of a frame in a predetermined schedule.

In addition, the computing cost is low. The resolution of the error counters and indices is lower (e.g. 8 bits) without decreasing the precision of the system.

In a conventional approach, calculations are made on timers with substantial resolutions (e.g. 96 bits) since this is required for the time precision.

In the case of a hardware implementation, the computing cost is directly linked to the cost of the hardware resources (small silicon footprint).

Also proposed, according to another aspect of the invention, is a deterministic hardware system for communication between at least one sender and at least one receiver, configured to statically and periodically schedule the data frames, a frame comprising a header provided with an identifier of the frame and an index representing the occurrence of said frame in a hyper-period, in which:

a sender comprises:
  a stored frame table comprising, per frame, parameters comprising a frame identifier, an index representing the occurrence of said frame in a hyper-period, a data payload size, a payload data memory address, and a sending time;
  a time scheduler configured to:
    manage the frame schedule and read the frame table,
    trigger the sending of the parameters of the frame to a schedule header encapsulator when the time reaches the sending time for the frame, a header comprising the identifier and the index that are added to the payload data, and
    read the parameters of the next frame in the frame table in the frame schedule;
  the schedule header encapsulator is configured to encapsulate the header of the frame, then transmit the frame to a protocol payload packetizer;
  the protocol payload packetizer is configured to encapsulate the frame headers according to the communication protocol used; and
a receiver comprises:
  a schedule table comprising, per frame, parameters comprising a frame identifier, an index representing the occurrence of said frame in a hyper-period, an opening time and a closing time for a time window associated with the identifier of the frame;
  a tracking table comprising an acknowledgement flag representative of the reception of the expected frame, an error counter for expected frame reception representative of the successive number of frames not received in the expected respective time window, a fatal error flag representative of the error counter reaching a configurable maximum error value, and an open flag representative of the opening of a time window for the frame;
  a frame table comprising, per frame, an activation flag for the identifier of the frame representative of the activity of the frame in the configuration currently running, a local index representative of the expected index for the frame, a number of possible values of the index that may be taken by the index in a hyper-period;
  a timed schedule tracker configured to perform, iteratively:
    reading, in the schedule table, the opening time and the closing time for the time window;
    when the opening time is reached, raising the open flag and when the closing time is reached, lowering the open flag;
    if the acknowledgement flag is lowered, then incrementing the error counter by 1, otherwise lowering the acknowledgement flag;
    raising the fatal error flag if the error counter reaches the configurable maximum successive error value;
    moving on to the next address in the schedule table;
  a protocol payload depacketizer configured to decode the header of the protocol used and transmit the depacketized frame to a timed schedule checker; and
  the timed schedule checker configured to:
    extract the identifier and the index from the header of the depacketized frame;
    validate the frame if the activity flag for the identifier is raised, the current time is between the opening time and the closing time for the time window, and the fatal error flag is lowered.

Such a system makes it possible to control and check a communication schedule with time constraints deterministically and at a low hardware cost (small silicon footprint).

According to one embodiment, the system further comprises an error handler module, configured to recover hardware schedule drifts via hardware interrupts, and comprising a control interface.

Thus, the system monitoring module has access to drifts in the communication schedule. Based on this information, it will therefore be able to take corrective actions, inform a remote central unit, or restart, depending on the fault correction strategy defined.

In one embodiment, the error handler module is embedded in a processor.

Specifically, it seems logical to embed this type of function in a processor. There is no advantage in embedding it in a hardware accelerator since there is no substantial time constraint.

Also proposed, according to another aspect of the invention, is a multi-protocol gateway comprising an FPGA-type hardware portion and an ARM processor portion, in which:
  the ARM processor portion comprises a configuration of the IP hardware and the error handler module;
  the FPGA-type hardware portion comprises the hardware implementation of the low-latency multi-protocol gateway; and
  each protocol interface comprises an instance of the system such as described above.

In a multi-protocol gateway, a hardware implementation with a small silicon footprint for managing the scheduling of communications is highly advantageous. This makes it possible to scale up more easily in terms of number of interfaces scheduled with time constraints specific to each one.

Software approaches or mixed software and hardware approaches have a limit with respect to the software portion.

Specifically, managing a large number of interrupts is not viable for functions with critical time constraints.

BRIEF DESCRIPTION OF THE DRAWINGS

The invention will be better understood on studying a few embodiments described by way of completely non-limiting examples and illustrated by the appended drawing, in which.

Throughout the figures, elements having identical references are similar.

DETAILED DESCRIPTION

Figure 3:
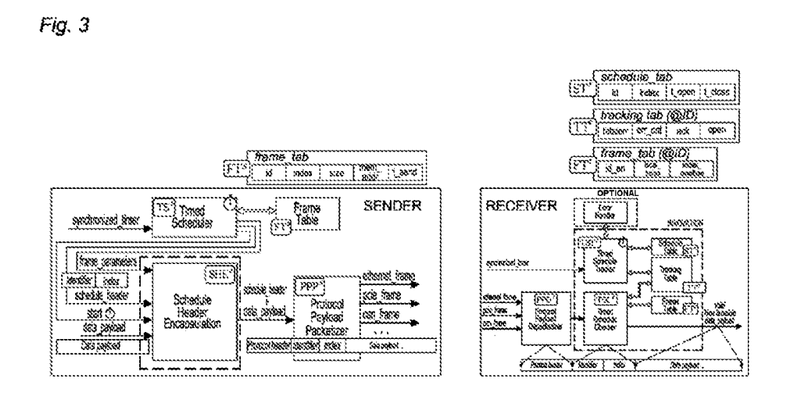
FIG. 3 schematically illustrates a system comprising a sender and a receiver implementing a static and periodic schedule for communications, according to one aspect of the invention.

FIG. 3 illustrates, according to one aspect of the invention, a deterministic hardware system for communication between a sender SENDER and a receiver RECEIVER in real time.

In the hardware implementation proposed, the sender SENDER adds an additional header in order to identify the frames and the time constraints associated therewith. The receiver RECEIVER has embedded a timed schedule tracker TSTr dedicated to tracking drifts in the schedule and a timed schedule checker TSCr located after a protocol payload depacketizer PPDr. A shared memory allows information to be exchanged between the tracker and checker modules.

The system is configured to statically and periodically schedule the data frames, a frame comprising a header provided with an identifier id of the frame and an index index representing the occurrence of said frame in a hyper-period.

The sender SENDER comprises a stored frame table FTs comprising, per frame, parameters comprising a frame identifier id, an index index representing the occurrence of said frame in a hyper-period, a data payload size size, a payload data memory address mem_addr, and a sending time t_send.

The sender SENDER also comprises:
a time scheduler $TS^S$ configured to:
manage the frame schedule and read the frame table $FT^S$,
trigger the sending of the parameters of the frame to a schedule header encapsulator $SHE^S$ when the time reaches the sending time t_send for the frame, a header comprising the identifier id and the index index that are added to the payload data, and
read the parameters of the next frame in the frame table $FT^S$ in the frame schedule,
the schedule header encapsulator $SHE^S$ configured to encapsulate the header of the frame, then transmit the frame to a protocol payload packetizer $PPP^S$, and
the protocol payload packetizer $PPP^S$ configured to encapsulate the frame headers according to the communication protocol used.

The receiver RECEIVER comprises:
a schedule table $ST^r$ comprising, per frame, parameters comprising a frame identifier id, an index index representing the occurrence of said frame in a hyper-period, an opening time t_open and a closing time t_close for a time window associated with the identifier id of the frame;
a tracking table $TT^r$ comprising an acknowledgement flag ack representative of the reception of the expected frame, an error counter err_cnt for expected frame reception representative of the successive number of frames not received in the expected respective time window, a fatal error flag fatalerr representative of the error counter err_cnt reaching a configurable maximum error value max_err, and an open flag open representative of the opening of a time window for the frame; and
a frame table $FT^r$ comprising, per frame, an activation flag for the identifier of the frame id_en representative of the activity of the frame in the configuration currently running, a local index local_index representative of the expected index for the frame, a number of possible values of the index index overflow that may be taken by the index index in a hyper-period.

The receiver RECEIVER also comprises:
a timed schedule tracker $TST^r$ configured to perform, iteratively:
reading, in the schedule table $ST^r$, the opening time t_open and the closing time t_close for the time window,
when the opening time t_open is reached, raising the open flag open and when the closing time t_close is reached, lowering the open flag open,
if the acknowledgement flag ack is lowered, then incrementing the error counter err_cnt by 1, otherwise lowering the acknowledgement flag ack,
raising the fatal error flag fatalerr if the error counter err_cnt reaches the configurable maximum successive error value max_err, and
moving on to the next address in the schedule table $ST^r$,
a protocol payload depacketizer $PPD^r$ configured to decode the header of the protocol used and transmit the depacketized frame to a timed schedule checker $TSC^r$, and
the timed schedule checker $TSC^r$ configured to:
extract the identifier id and the index index from the header of the depacketized frame, and
validate the frame if the activity flag id_en for the identifier id is raised, the current time is between the opening time t_open and the closing time t_close for the time window, and the fatal error flag fatalerr is lowered.

In other words, in the sender SENDER, the timed scheduler TSs is responsible for executing the communication schedule. It reads the frame table FTs in order to retrieve the parameters of the frame to be sent: send date t_send, identifier id, index index, size size and address mem_addr of the data (stored in memory). When the timer reaches the send date, the timed scheduler TSs triggers sending and transmits the parameters of the frame to the schedule header encapsulator SHEs. The timed scheduler TSs then reads the next address in the frame table FTs and continues working through the communication schedule.

The schedule header encapsulator SHEs encapsulates the header composed of the identifier id and the index index before transmitting the frame to the protocol payload packetizer PPPS. The protocol payload packetizer PPPS is specific to the protocol used (Ethernet, CAN, PCIe, etc.). In particular, it is responsible for encapsulating the one or more specific headers.

Likewise, in other words, the timed schedule tracker TSTr is a dedicated module for tracking the communication schedule which allows drifts from this schedule to be stored in memory. It reads the schedule table STr in order to retrieve the opening and closing dates for the first time window. When the timer reaches the opening time t_open, the open flag open for the tracking table TTr is activated, and is deactivated when the timer reaches the closing time t_close.

At the same time, the reception acknowledgement flag ack contained in the schedule table STr is consulted. If it is inactive, the error counter err_cnt is incremented by 1 in order to indicate that the expected frame has not been received in the expected time window. Once processed, the reception acknowledgement flag ack is reset to zero. A fatal error flag fatalerr may be activated if the error counter err_cnt reaches a configurable limit value. This signal corresponds to a series of consecutive errors, indicating a fault. The associated communications are therefore rejected until further notice. The process then continues tracking the schedule by moving onto the next address in the schedule table STr.

An optional enhancement may consist in having an error handling process which recovers schedule drifts via hardware interrupts and a control interface. This module may be embedded in a processor.

Upon receiving a frame, the protocol payload depacketizer PPDr decodes the header specific to the protocol used and transmits the rest of the frame to the timed schedule checker TSCr.

The timed schedule checker TSCr extracts the header comprising the identifier id and the index index in order to carry out multiple checks. For a frame to be valid, the activity flag id_en for the identifier id has to be raised, the fatal error flag fatalerr has to be lowered, and the frame has to arrive in the time window defined by the schedule (checking method described in detail further below).

A unique identifier id and an index index are added to the header of the data. These two items of information allow a communication to be located in the schedule.

As presented above, the offline analysis allows a periodic schedule to be defined. Depending the duration of the periods for the frames which pass through the network, a hyper-period is found. Thus, a communication with a send period of short duration is identified with an index index that has a range of values higher than a communication with a send period of long duration. For a given identifier, the index represents the sending of the data at different times and allows them to be located in the hyper-period.

Figure 4:
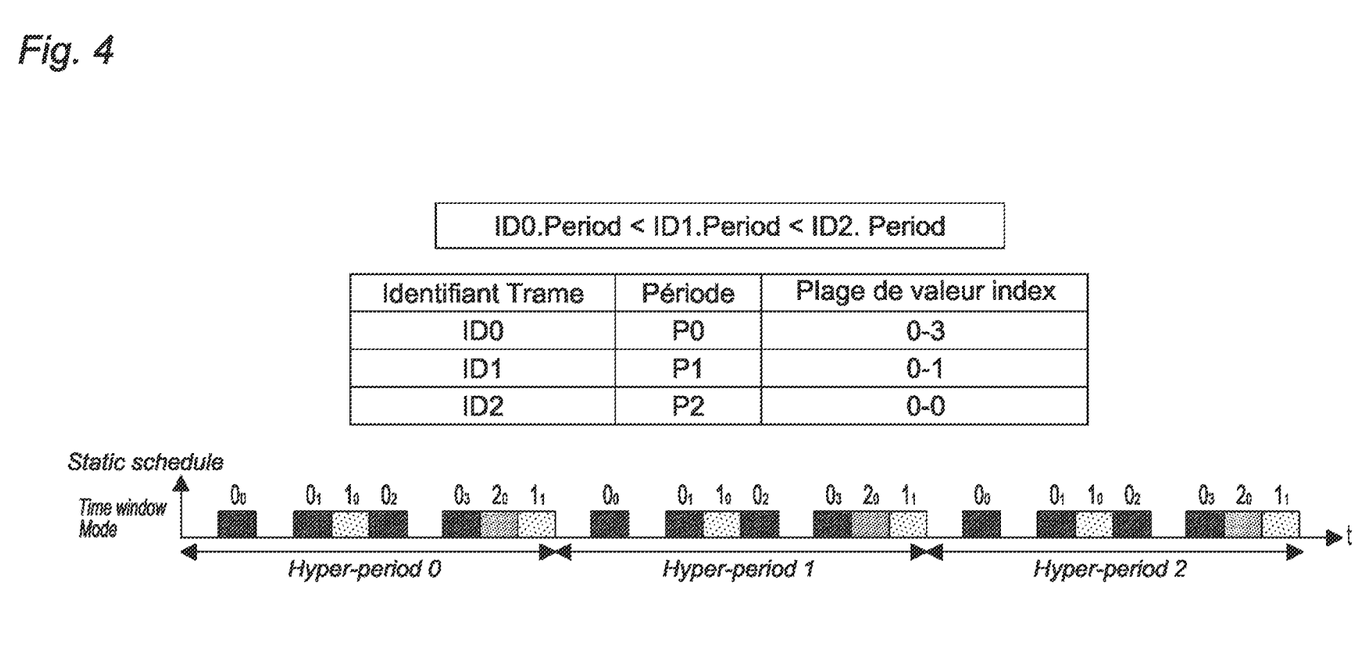
FIG. 4 schematically illustrates an exemplary static periodic schedule, according to one aspect of the invention.

In the exemplary frame schedule of FIG. 4, the first character represents the unique identifier id and the second character represents the index index of the frames.

Figure 5:
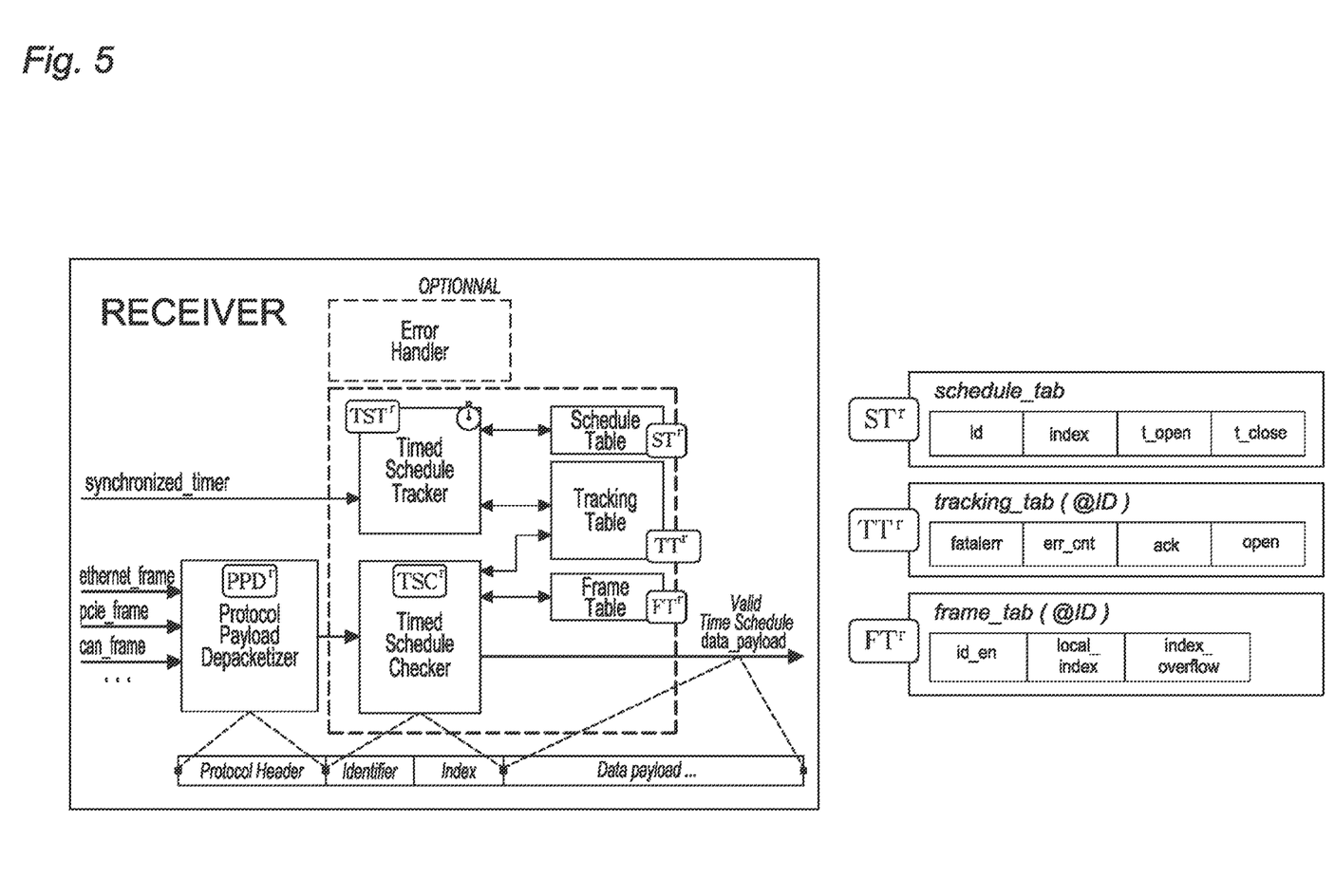
FIG. 5 schematically illustrates a receiver, according to another aspect of the invention.

FIG. 5 schematically represents a receiver RECEIVER according to one aspect of the invention. The timed schedule checker TSCr is connected behind the protocol payload depacketizer PPDr specific to the protocol (Ethernet, PCIe, CAN, etc.). The identifier id and the index index are extracted from the frame by the module TSCr.

Figure 6:
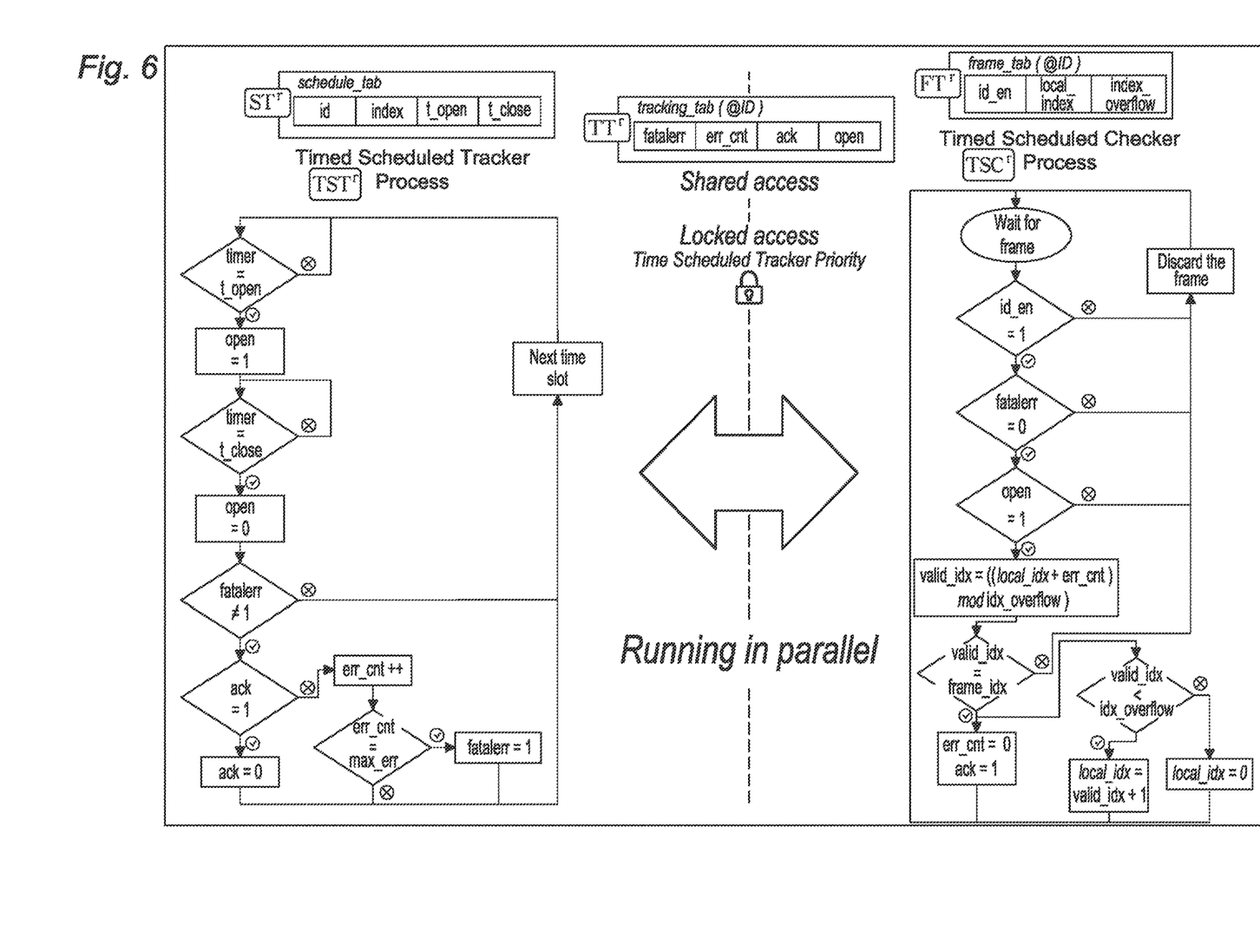
FIG. 6 schematically illustrates a method for managing the reception of data frames, scheduled statically and periodically, according to one aspect of the invention.

The checking process or method for managing the reception of frames is shown in FIG. 6.

The method for managing the reception of data frames in deterministic real time by implementing dedicated hardware, scheduled statically and periodically, a frame comprising a header provided with an identifier id of the frame and an index index representing the occurrence of said frame in a hyper-period, comprising the steps of:

storing, for a frame identifier, an activity flag for the identifier of the frame id_en representative of the activity of the frame in the configuration currently running, a local index local_index representative of the expected index for the frame, an open flag open representative of the opening of a time window associated with the identifier id of the frame, an opening time t_open and a closing time t_close for the time window, an acknowledgement flag ack representative of the reception of the expected frame, an error counter err_cnt for expected frame reception representative of the successive number of frames not received in the expected respective time window, a fatal error flag fatalerr representative of the error counter err_cnt reaching a configurable maximum error value max_err, a number of possible values of the index index_overflow that may be taken by the index index in a hyper-period; performing in parallel:

iteratively:
  waiting for the reception of a frame, and on reception of a frame, testing whether the status of the flag for the identifier id_en is raised, and whether the fatal error flag fatalerr is lowered, and whether the open flag is raised, and whether the value of a valid index valid_index equal to the remainder of the Euclidean division of the sum of a local index local_index with the value of the expected index and with the value of the error counter err_cnt by the number of possible values of the index index_overflow is equal to the value of the index index of the frame (valid_index=(FT".local_index+TT".err_cnt) mod TT".index_overflow),
  if so, resetting the error counter err_cnt to 0 and raising the acknowledgement flag ack, and if the value of the valid index valid_index is lower than the number of possible values of the index index_overflow, updating the value of the local index local_index with the value of the valid index valid_index increased by 1, otherwise resetting the valid index valid_index to 0,
  and otherwise, rejecting the frame; and
iteratively:
  when the opening time t_open for a frame is reached, raising the open flag open and when the closing time t_close is reached, lowering the open flag open;
  if the fatal error flag is raised, moving on to the next window, otherwise, if the acknowledgement flag ack is raised, then lowering the acknowledgement flag ack, otherwise incrementing the error counter err_cnt by 1, and if the error counter err_cnt has a different value than the maximum error value max_err, then lowering the fatal error flag fatalerr; moving on to the next time window.

Two processes described above operate in parallel. They interact via shared data contained in the tracking table TTr. A mechanism for locking access to the data is in place in order to prevent concurrent accesses to the same datum. The strategy employed gives priority to the process implemented by the time schedule tracker TSTr; thus, for each concurrent access request to read or write the shared data, the process implemented by the timed sequence checker TSCr puts itself on hold until the availability of the datum.

Figure 7:
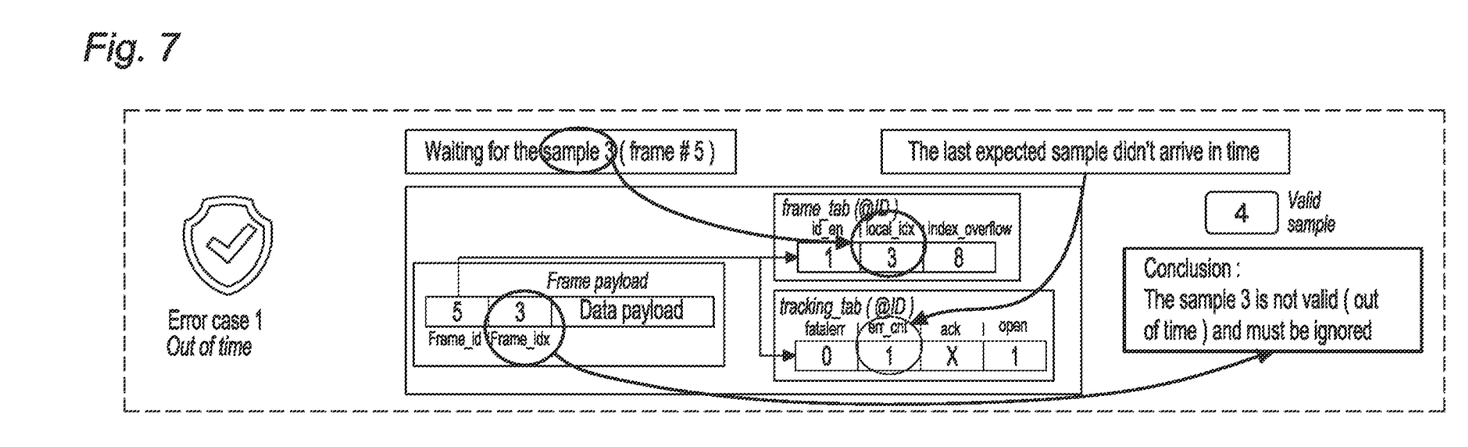
FIG. 7 schematically illustrates an exemplary execution of the method of FIG. 6, according to another aspect of the invention.
Figure 8:
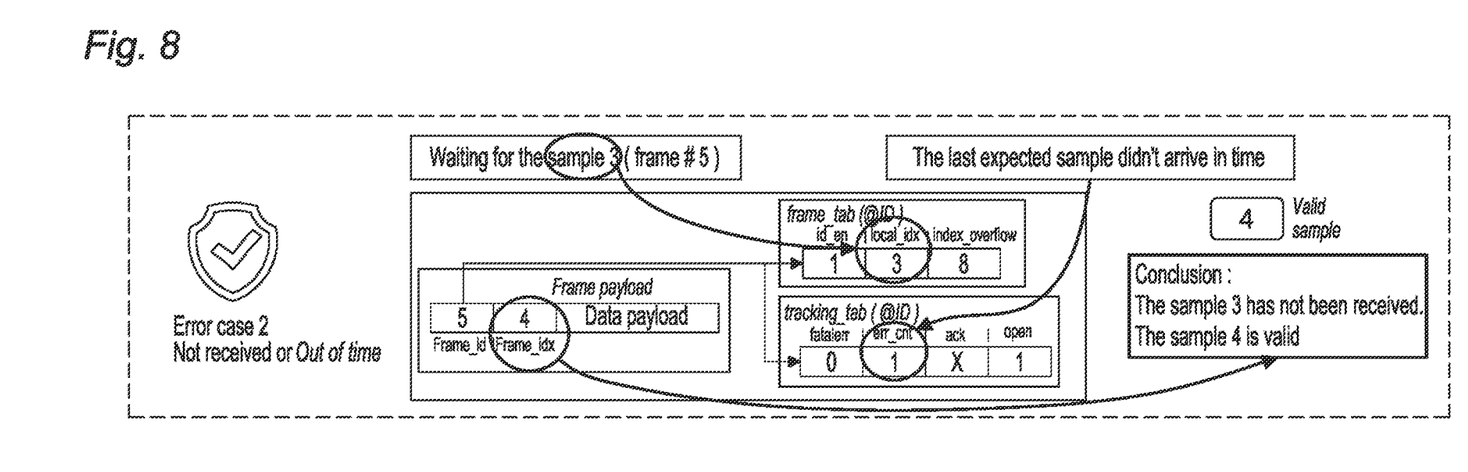
FIG. 8 schematically illustrates an exemplary execution of the method of FIG. 6, according to another aspect of the invention.
Figure 9:
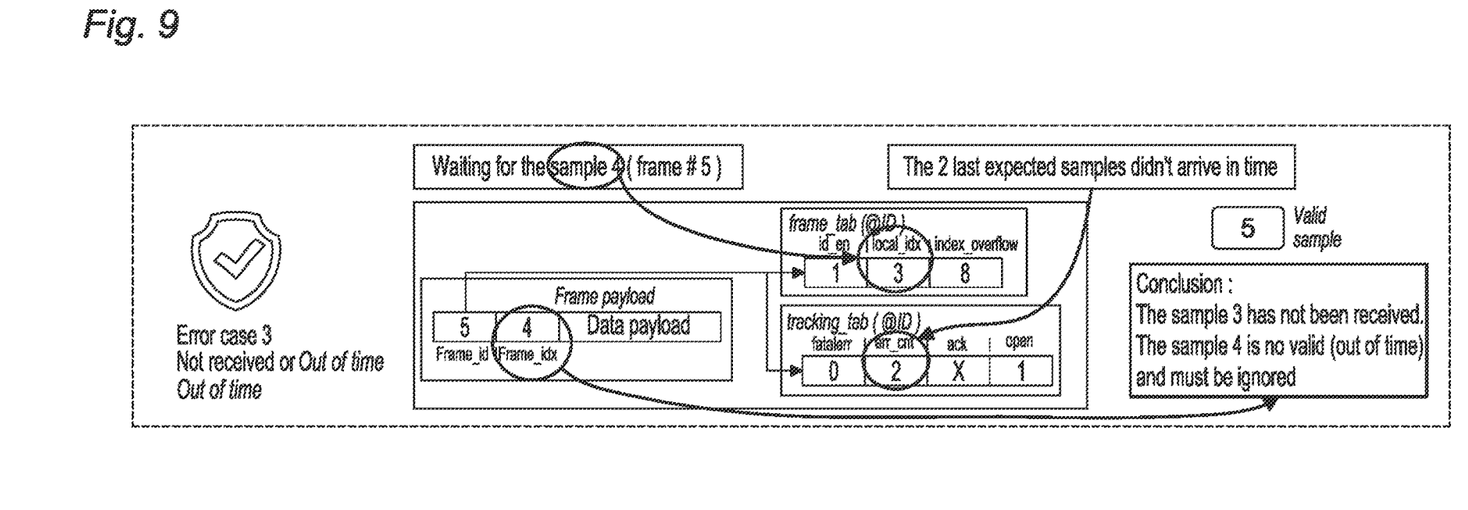
FIG. 9 schematically illustrates an exemplary execution of the method of FIG. 6, according to another aspect of the invention.

FIGS. 7, 8 and 9 schematically shows three exemplary executions of the method of the invention.

In the case of FIG. 7, it may be seen that the identifier id is indeed valid (FT″.id_en=1), that the fatal error flag fatalerr is lowered or inactive (TT″.fatalerr=0) and that the time window is open (the open flag open is raised or active: TT″.open=1). However, the expected index has a value of 3 (FT″.local_index=3) and the schedule drift counter or error counter has a value of 1 (TT″.err_cnt=1). It may be deduced that, at the time of reception, the time window is the time window of index 4. The frame of index 3 is therefore out of time and is rejected.

In the case of FIG. 8, the same memory content is found for a received frame of index 4. Since it is in the right time window, the frame is valid. The error counter is reset to zero (TT″.err_cnt=0), the delivery receipt or acknowledgement flag is raised or activated (TT″.ack=1) and the pending index takes the value of the valid index incremented by 1 (FT″.local_index=5).

In the case of FIG. 9, only the error counter has changed with respect to the memory content (TT″.err_cnt=2). It may be deduced that, at the time of reception, the time window is the time window of index 5. The frame of index 3 has therefore not been received or is out of time, and the frame of index 4 is out of time and therefore rejected.

Figure 10:
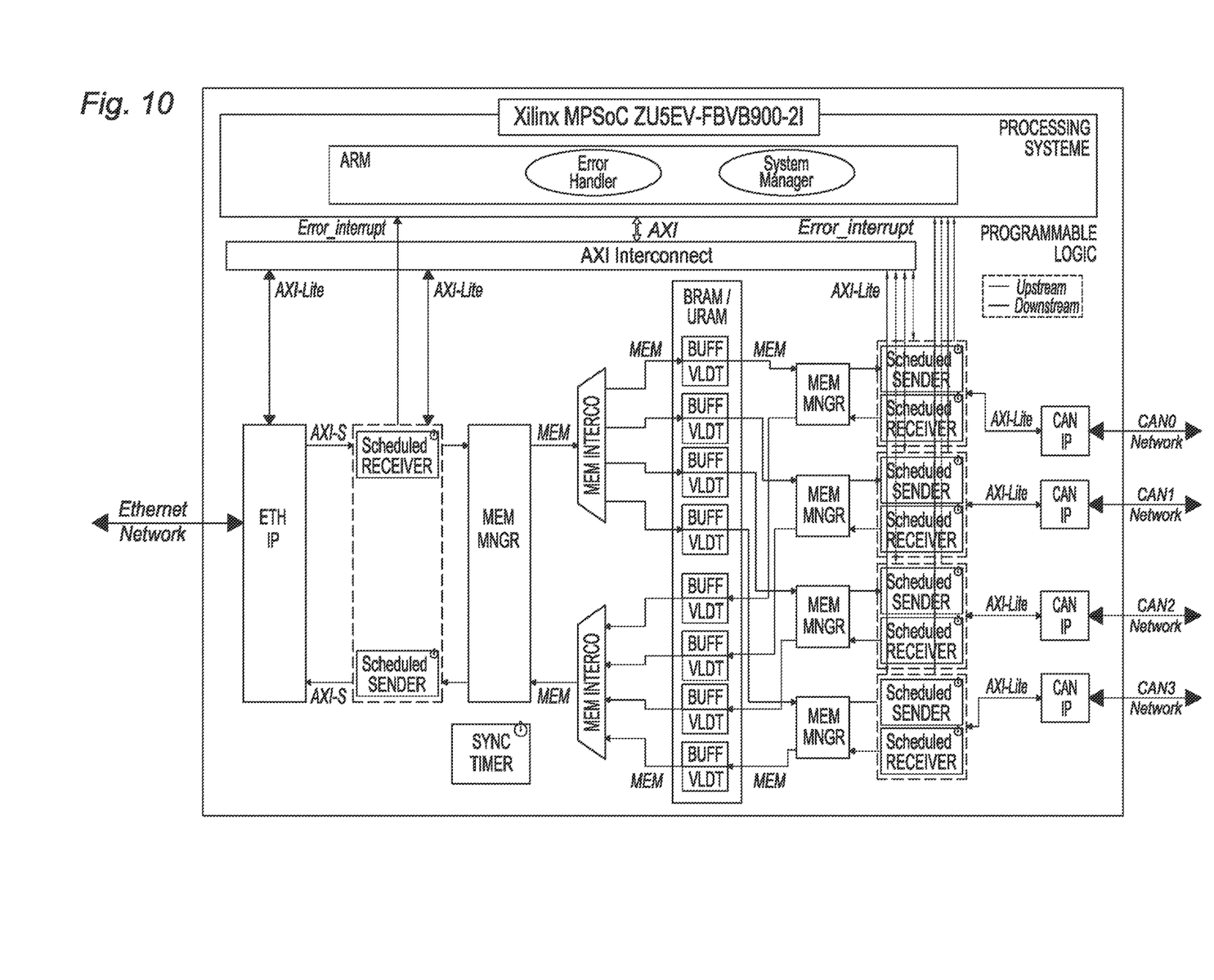
FIG. 10 schematically illustrates a multi-protocol gateway, according to another aspect of the invention.

Also proposed, according to one aspect of the invention, as illustrated in FIG. 10, is a multi-protocol gateway comprising an FPGA-type hardware portion and an ARM processor portion, in which:

the ARM processor portion comprises a configuration of the IP hardware and the error handler module;

the FPGA-type hardware portion comprises the hardware implementation of the low-latency multi-protocol gateway;

each protocol interface comprises an instance of the system.

Figure 11:
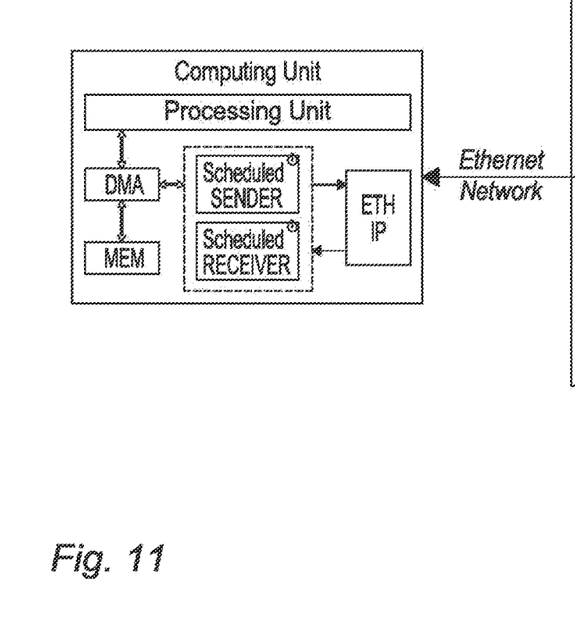
FIG. 11 schematically illustrates a multi-protocol gateway, according to another aspect of the invention.

FIGS. 10 and 11 show a multi-protocol gateway design based on an UltraScale+ MPSoC by Xilinx which comprises an FPGA-type hardware portion and an ARM processor portion. The configuration of the various hardware IPs (Intellectual properties) and the error handling are embedded in the processor portion (software). The FPGA portion has embedded the hardware implementation of the low-latency multi-protocol gateway.

For each interface (Ethernet, CAN0, CAN1, etc.), an instance of the modules for checking the scheduling of the communications is implemented (system according to the invention).

This embodiment shows the advantage of a hardware solution which may be duplicated for each interface that requires a deterministic communication schedule. Specifically, a software solution requires the management of a large number of interrupts and therefore cannot guarantee that the time constraints are observed deterministically.

The invention claimed is:

1. A method for managing the reception of data frames in deterministic real time by implementing dedicated hardware, scheduled statically and periodically, a frame comprising a header provided with an identifier (id) of the frame and an index (index) representing the occurrence of said frame in a hyper-period, comprising the steps of:

storing, for a frame identifier, an activation flag for the identifier of the frame (id_en) representative of the activity of the frame in the configuration currently running, a local index (local_index) representative of the expected index for the frame, an open flag (open) representative of the opening of a time window associated with the identifier (id) of the frame, an opening time (t_open) and a closing time (t_close) for the time window, an acknowledgement flag (ack) representative of the valid reception of the expected frame, an error counter (err_cnt) for expected frame reception representative of the successive number of frames not received in the expected respective time window, a fatal error flag (fatalerr) representative of the error counter (err_cnt) reaching a configurable maximum error value (max_err), a number of possible values of the index (index_overflow) that may be taken by the index (index) in a hyper-period;

performing in parallel:
iteratively:
waiting for the reception of a frame, and on reception of a frame, testing whether the status of the activation flag for the identifier (id_en) is raised, and whether the fatal error flag (fatalerr) is lowered, and whether the open flag is raised, and whether the value of a valid index (valid_index) equal to the remainder of the Euclidean division of the sum of a local index (local_index) with the value of the expected index and with the value of the error counter (err_cnt) by the number of possible values of the index (index_overflow) is equal to the value of the index (index) of the frame, if so, resetting the error counter (err_cnt) to 0 and raising the acknowledgement flag (ack), and if the value of the valid index (valid_index) is lower than the number of possible values (index_overflow) of the index, updating the value of the local index (local_index) with the value of the valid index (valid_index) increased by 1, otherwise resetting the valid index (valid_index) to 0, and otherwise, rejecting the frame; and iteratively:
when the opening time (t_open) for a frame is reached, raising the open flag (open) and when the closing time (t_close) is reached, lowering the open flag (open);

if the fatal error flag is raised, moving on to the next window, otherwise, if the acknowledgement flag (ack) is raised, then lowering the acknowledgement flag (ack), otherwise incrementing the error counter (err_cnt) by 1, and if the error counter (err_cnt) has a different value than the maximum error value (max_err), then lowering the fatal error flag (fatalerr); moving on to the next time window.

2. The system according to claim 1, further comprising an error handler module, configured to recover hardware schedule drifts via hardware interrupts, and comprising a control interface.

3. The system according to claim 1, wherein the error handler module is embedded in a processor.

4. A deterministic hardware system for communication between at least one sender (SENDER) and at least one receiver (RECEIVER), configured to statically and periodically schedule the data frames, a frame comprising a header provided with an identifier (id) of the frame and an index (index) representing the occurrence of said frame in a hyper-period, wherein:
- a sender (SENDER) comprises:
  - a stored frame table ($FT^S$) comprising, per frame, parameters comprising a frame identifier (id), an index (index) representing the occurrence of said frame in a hyper-period, a data payload size (size), a payload data memory address (mem_addr), and a sending time (t_send);
  - a time scheduler ($TS^S$) configured to:
    - manage the frame schedule and read the frame table ($FT^S$),
    - trigger the sending of the parameters of the frame to a schedule header encapsulator ($SHE^S$) when the time reaches the sending time (t_send) for the frame, a header comprising the identifier (id) and the index (index) that are added to the payload data, and
    - read the parameters of the next frame in the frame table ($FT^S$) in the frame schedule,
  - the schedule header encapsulator ($SHE^S$) configured to encapsulate the header of the frame, then transmit the frame to a protocol payload packetizer ($PPP^S$); and
  - the protocol payload packetizer ($PPP^S$) configured to encapsulate the frame headers according to the communication protocol used;
- a receiver (RECEIVER) comprises:
  - a schedule table ($ST^r$) comprising, per frame, parameters comprising a frame identifier (id), an index (index) representing the occurrence of said frame in a hyper-period, an opening time (t_open) and a closing time (t_close) for a time window associated with the identifier (id) of the frame;
  - a tracking table ($TT^r$) comprising an acknowledgement flag (ack) representative of the reception of the expected frame, an error counter (err_cnt) for expected frame reception representative of the successive number of frames not received in the expected respective time window, a fatal error flag (fatalerr) representative of the error counter (err_cnt) reaching a configurable maximum error value (max_err), and an open flag (open) representative of the opening of a time window for the frame;
  - a frame table ($FT^r$) comprising, per frame, an activation flag for the identifier of the frame (id_en) representative of the activity of the frame in the configuration currently running, a local index (local_index) representative of the expected index for the frame, a number of possible values of the index (index_overflow) that may be taken by the index (index) in a hyper-period;
  - a timed schedule tracker (TST) configured to perform, iteratively:
    - reading, in the schedule table ($S^r$), the opening time (t_open) and the closing time (t_close) for the time window,
    - when the opening time (t_open) is reached, raising the open flag (open) and when the closing time (t_close) is reached, lowering the open flag (open),
    - if the acknowledgement flag (ack) is lowered, then incrementing the error counter (err_cnt) by 1, otherwise lowering the acknowledgement flag (ack),
    - raising the fatal error flag (fatalerr) if the error counter (err_cnt) reaches the configurable maximum successive error value (max_err), and moving on to the next address in the schedule table ($ST^r$)
  - a protocol payload depacketizer ($PPD^r$) configured to decode the header of the protocol used and transmit the depacketized frame to a timed schedule checker ($TSC^r$); and
  - the timed schedule checker ($TSC^r$) configured to:
    - extract the identifier (id) and the index (index) from the header of the depacketized frame, and
    - validate the frame if the activity flag (id_en) for the identifier is raised, the current time is between the opening time (t_open) and the closing time (t_close) for the time window, and the fatal error flag (fatalerr) is lowered.

5. A multi-protocol gateway comprising an FPGA-type hardware portion and an Advanced Reduced Instructions Set Computer Machines (ARM) processor portion, wherein the ARM processor portion comprises a configuration of the IP hardware and the error handler module;
- the FPGA-type hardware portion comprises the hardware implementation of the low-latency multi-protocol gateway;
- comprising one or more protocol interfaces each comprising the deterministic hardware system according to claim 4.

* * * * *